United States Patent [19]

Sumiya et al.

[11] Patent Number: 4,536,444

[45] Date of Patent: Aug. 20, 1985

[54] MAGNETIC RECORDING MEDIUM

[75] Inventors: Kenji Sumiya, Suita; Fumio Togawa, Ohtsu; Osamu Saito, Takatsuki, all of Japan

[73] Assignee: Hitachi Maxell, Ltd., Osaka, Japan

[21] Appl. No.: 671,960

[22] Filed: Nov. 16, 1984

[30] Foreign Application Priority Data

Nov. 17, 1983 [JP] Japan .................................. 58-217274

[51] Int. Cl.$^3$ ................................................ G11B 5/72
[52] U.S. Cl. ...................................... 428/340; 360/134; 360/133; 360/136; 427/128; 427/131; 427/132; 428/421; 428/422; 428/694; 428/695; 428/900; 428/704; 252/49.9
[58] Field of Search .............. 428/422, 695, 421, 694, 428/900, 340, 704; 427/128, 131, 132; 360/134–136; 252/49.9

[56] References Cited

U.S. PATENT DOCUMENTS

| 3,810,874 | 5/1974 | Mitsch | 528/70 |
| 4,043,926 | 8/1977 | Snyder | 252/49.9 |
| 4,085,137 | 4/1978 | Mitsch | 528/25 |
| 4,094,911 | 6/1978 | Mitsch | 428/422 |
| 4,169,904 | 10/1979 | Czornyj | 428/422 |
| 4,267,238 | 5/1981 | Chernega | 428/422 |
| 4,268,556 | 5/1981 | Pedrotty | 428/695 |
| 4,308,063 | 12/1981 | Horiuchi | 252/49.9 |
| 4,327,139 | 4/1982 | Schaefer | 428/422 |
| 4,404,247 | 9/1983 | Burguette | 428/694 |
| 4,431,555 | 2/1984 | Christian | 252/49.9 |
| 4,446,193 | 5/1984 | Afzali-Ardakani | 428/422 |
| 4,472,480 | 9/1984 | Olson | 428/900 |

Primary Examiner—Ellis P. Robinson
Attorney, Agent, or Firm—Birch, Stewart, Kolasch & Birch

[57] ABSTRACT

A magnetic recording medium comprising a substrate, a magnetic layer formed on the substrate and comprising a metallic magnetic material as a recording element and a protective layer formed on the magnetic layer and comprising a perfluroalkyl polyether derivative having a phosphate terminal group, which has improved durability and corrosion resistivity.

11 Claims, No Drawings

MAGNETIC RECORDING MEDIUM

FIELD OF THE INVENTION

The present invention relates to a magnetic recording medium. More particularly, it relates to a magnetic recording medium provided with a protective layer on a magnetic layer to impart good durability and corrosion resistivity to the recording medium.

BACKGROUND OF THE INVENTION

Generally, a magnetic recording medium is produced by painting a magnetic powder composition comprising magnetic powder and a binding agent on a substrate film surface or by metallizing the surface with a ferromagnetic metal or its alloy and the like to form a magnetic layer. Since the magnetic layer is vigorously slid on a magnetic head during playback, its surface tends to be seriously abrased. Although the magnetic recording medium of the ferromagnetic metallic thin layer type produced by metallizing and the magnetic recording medium having the metallic magnetic powder are excellent in high density recording property, their surfaces have large friction coefficient against the magnetic head so that they tend to be easily abrased or damaged in use and further gradually oxidized in the air resulting in deterioration of their magnetic characteristics such as maximum magnetic flux density.

In order to improve durability and corrosion resistivity of these magnetic recording media, it is proposed to form on the magnetic layer a protective layer comprising a fluorine-containing lubricant such as a tetrafluoroethylene telomer and perfluoroalkyl polyether. Since the conventional fluorine-containing lubricant has poor interaction with the surface of the magnetic layer particularly one comprising a metallic magnetic material, it easily breaks off due to contact sliding on the magnetic head. Therefore, it is still desired to improve durabilty and corrosion resistance of the magnetic recording medium.

SUMMARY OF THE INVENTION

One object of the present invention is to provide a magnetic recording medium having improved durability and corrosion resistivity.

Another object of the invention is to provide a magnetic recording medium having on a magnetic layer a protective layer which does not easily break off, shows improved durability and prevents corrosion or oxidation of the magnetic layer.

DETAILED DESCRIPTION OF THE INVENTION

According to the present invention, there is provided a magnetic recording medium comprising a substrate, a magnetic layer formed on the substrate and comprising a metallic magnetic material as a recording element and a protective layer formed on the magnetic layer and comprising a perfluoroalkyl polyether derivative having a phosphate terminal group.

Specific examples of the perfluoroalkyl polyether derivative having a phosphate terminal group are those represented by the formula:

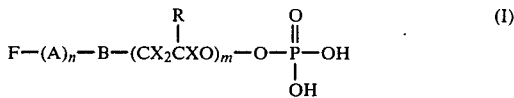

wherein A is a group of the formula:

—[CF(CF$_3$)—CF$_2$O]—,

—(CF$_2$CF$_2$O)— or

—(CF$_2$O)—

B is a group of the formula:

—(CF$_2$COO)— or

—[CF(CF$_3$)—COO]—

X is hydrogen or fluorine, R is hydrogen, fluorine, methyl, trifluoromethyl or chloromethyl, n is an integer of 10 to 50, preferably 20 to 40 and m is an integer of 1 to 50, preferably 5 to 30.

Since the perfluoroalkyl polyether derivative used in the invention has a phosphate terminal group which has good affinity to the magnetic layer containing the hydrophilic metallic magnetic material as the recording element, the phosphate group is strongly oriented to and absorbed by the surface of the magnetic layer. Therefore, the absorption on the magnetic layer is improved and the break off of the protective layer in use is effectively prevented. Since in the protective layer, perfluoroalkyl group is oriented in a direction opposite to the magnetic layer, its lubrication effect and water- and oil-repellency are exerted on the surface of the protective layer. Therefore, the perfluoroalkyl polyether derivative is strongly bound to the magnetic layer to form the protective layer having good lubricity. Thus, the protective layer is not easily abrased by the magnetic head in use and the durability and corrosion resistivity of the magnetic recording medium are greatly improved.

In addition, the protective layer comprising the perfluoroalkyl polyether derivative smooths the surface of the recording medium, which makes a gap between the magnetic head and the recording medium uniform and reduces drop out and spacing loss. Due to this, the characteristics of the recording medium for high density recording is effectively realized.

The perfluoroalkyl polyether derivative is applied on the magnetic layer by immersing the substrate having the magnetic layer in a solution of the polyether derivative in a suitable solvent such as toluene, halogenated hydrocarbons (e.g. Freon (trade mark)), and the like, or by coating or spray coating the magnetic layer with the solution, and then drying it to remove the solvent. The perfluoroalkyl polyether derivative may be used alone or as a mixture of two or more derivatives. The amount of the protective layer is preferably from 0.01 to 30 mg/m$^2$, preferably from 0.1 to 10 mg/m$^2$, more preferably from 0.2 to 5 mg/m$^2$. If it is less that 0.01 mg/m$^2$, the desired effect of the protective layer is not achieved. If it is more than 30 mg/m$^2$, out put may decreases and/or the drop out may occur.

The magnetic layer may be formed on the substrate by a per se conventional method, for example, by coating a mixture of metal powder (e.g. Fe powder, Co powder, Fe-Ni powder, etc.), a binding resin and a suitable solvent on the substrate and drying it, or by metallizing, ion plating, sputtering or plating the ferromagnetic material (e.g. Co, Ni, Fe, Co-Ni, Co-Cr, Co-P, Co-Ni-P, etc.) on the substrate.

The magnetic recording medium of the invention includes all the conventional ones such as a magnetic tape which comprises, as the substrate, synthetic resin film (e.g. polyethylene terephthalate film, etc.), a magnetic disc having a disc shape substrate and a magnetic drum having a drum shape substrate.

PREFERRED EMBODIMENTS OF THE INVENTION

The present invention will be hereinafter explained further in detail by following Examples.

EXAMPLE 1

A polyethylene terephthalate film of 12 microns in thickness was metallized with cobalt by a metallizing apparatus under a reduced pressure of $5 \times 10^5$ Torr to form a ferromagnetic metallic thin film of cobalt of 0.2 micron in thickness. Then, it was immersed in a 0.5 wt % solution of a fluorine-containing phosphate of the formula:

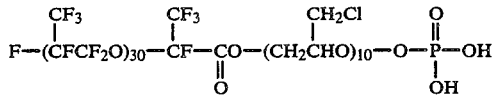

(Phosmer FO manufactured by Uni Chemical Co., Ltd.) in Freon TF and dried. The amount of the coated phosphate was 0.8 mg/m$^2$. The film was cut into a tape to form a magnetic tape.

EXAMPLE 2

In the same manner as in Example 1 but using a fluorine-containing phosphate of the formula:

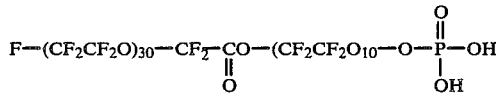

as a fluoroalkyl polyether derivative, a magnetic tape was produced. The amount of the coated phosphate was 0.8 mg/m$^2$.

EXAMPLE 3

A following composition was dispersed in a ball mill for 72 hours to prepare a magnetic coating and coated on a polyethylene terephthalate film of 12 microns in thickness and dried to form a magnetic layer of 6 microns in thickness.

| Composition | Parts by weight |
|---|---|
| Fe—Co magnetic powder | 80 |
| Vinyl chloride/vinyl acetate/vinyl alcohol copolymer (VAGH manufactured by U.C.C.) | 16 |
| Urethane prepolymer (Takenate L'1007 manufactured by Takeda Chemical Co., Ltd.) | 4 |
| Methyl isobutyl ketone | 61 |
| Toluene | 61 |

The thus formed film having the magnetic layer was immersed in the same solution of the fluorine-containing phosphate as used in Example 1 to produce a magnetic tape. The amount of the coated phosphate was 1.6 mg/m$^2$.

EXAMPLE 4

The polyester film having the magnetic layer formed in Example 3 was immersed in the same solution of the fluorine-containing phosphate as used in Example 2, a magnetic tape was produced. The amount of the coated phosphate was 1.5 mg/m$^2$.

COMPARATIVE EXAMPLE 1

In the same manner as in Example 1 but using perfluroalkyl polyether (Krytox (trade mark) 143 manufacture by Du Pont) in place of the fluorine-containing phosphate, a magnetic tape was produced. The amount of the coated polyether was 0.5 mg/m$^2$.

COMPARATIVE EXAMPLE 2

In the same manner as in Example 1 but using a fluorine-containing lubricant of the formula:

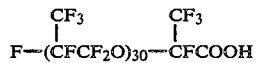

in place of the fluorine-containing phosphate, a magnetic tape was produced. The amount of the coated lubricant was 0.6 mg/m$^2$.

COMPARATIVE EXAMPLE 3

In the same manner as in Example 1, a polyethylene terephthalate film having the same magnetic layer was prepared, but any protective layer was not formed on the magnetic layer.

COMPARATIVE EXAMPLE 4

In the same manner as in Example 3 but using the same perfluroalkyl polyether used in Comparative Example 1 in place of the fluorine-containing phosphate, a magnetic tape was produced. The amount of the coated polyester was 1.1 mg/m$^2$.

COMPARATIVE EXAMPLE 5

In the same manner as in Example 3 but using the same lubricant as used in Comparative Example 2 in place of the fluorine-containing phosphate, a magnetic tape was produced. The amount of the coated polyester was 1.3 mg/m$^2$.

COMPARATIVE EXAMPLE 6

In the same manner as in Example 3, a polyethylene terephtjalate film having the same magnetic layer was prepared, but any protective layer was not formed on the magnetic layer.

Friction coefficient, durability and corrosion resistance of each of the magnetic tapes prepared in Examples or Comparative Examples were tested as follows:

Friction Coefficient

Around a cylindrical pin of 4 mm in outer diameter having surface roughness or 0.2 s, the magnetic tape was wrapped at a wrapping angle of 150° and forwarded under load of 21 g at a rate of 1.4 cm/sec. The same part of the tape was repeatedly forwarded under the same conditions. After one, 100 and 1,000 times, the friction coefficient of the tape surface was measured.

Durability

The magnetic tape was run under head load of 5 g at a rate of 0.048 m/sec., and number of runs when output was decreased by 3 dB from the initial out put was counted.

Corrosion Resistance

The magnetic tape was kept standing at 60° C. and relative humidity of 90%. At predetermined intervals, the maximum magnetic flux density of the recording tape was measured and compared with that of the tape before kept standing (100%).

The results are shown in following Table.

TABLE

|  | Friction coefficient | | | Durability (No. of runs) | Maximum magnetic flux density (%) | | | |
| --- | --- | --- | --- | --- | --- | --- | --- | --- |
|  | 1 time | 100 times | 1,000 times |  | 3 days | 7 days | 30 days | 1 year |
| Example 1 | 0.17 | 0.17 | 0.19 | 1,120 | 98 | 94 | 90 | 80 |
| Example 2 | 0.18 | 0.18 | 0.21 | 1,180 | 98 | 93 | 89 | 77 |
| Example 3 | 0.18 | 0.20 | 0.23 | 1,260 | 99 | 96 | 90 | 82 |
| Example 4 | 0.17 | 0.19 | 0.21 | 1,320 | 99 | 95 | 91 | 83 |
| Comparative Example 1 | 0.20 | 0.22 | 0.25 | 980 | 98 | 90 | 86 | 73 |
| Comparative Example 2 | 0.20 | 0.21 | 0.24 | 1,030 | 98 | 89 | 84 | 71 |
| Comparative Example 3 | 0.62 | 0.86 | 0.93 | 90 | 90 | 81 | 73 | 52 |
| Comparative Example 4 | 0.20 | 0.23 | 0.26 | 1,020 | 98 | 89 | 87 | 74 |
| Comparative Example 5 | 0.19 | 0.22 | 0.25 | 1,050 | 98 | 89 | 85 | 74 |
| Comparative Example 6 | 0.51 | 0.83 | 0.96 | 250 | 95 | 88 | 81 | 72 |

What is claimed is:

1. A magnetic recording medium comprising a substrate, a magnetic layer formed on the substrate and comprising a metallic magnetic material as a recording element and a protective layer formed on the magnetic layer and comprising a perfluroalkyl polyether derivative having a phosphate terminal group.

2. A magnetic recording medium according to claim 1, wherein the perfluroalkyl polyether derivative having a phosphate terminal group is a compound of the formula:

$$F-(A)_n-B-(CX_2CXO)_m-O-\overset{\overset{\displaystyle O}{\|}}{\underset{\underset{\displaystyle OH}{|}}{P}}-OH \qquad (I)$$

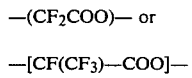

wherein A is a group of the formula:

—[CF(CF$_3$)—CF$_2$O]—,

—(CF$_2$CF$_2$O)— or

—(CF$_2$O)—

B is a group of the formula:

—(CF$_2$COO)— or

—[CF(CF$_3$)—COO]—

X is hydrogen or fluorine, R is hydrogen, fluorine, methyl, trifluoromethyl or chloromethyl, n is an integer of 10 to 50 and m is an integer of 1 to 50.

3. A magnetic recording medium according to claim 1, wherein an amount of the perfluroalkyl polyether derivative having a phosphate terminal group to be coated is from 0.01 to 30 mg/m$^2$.

4. A magnetic recording medium according to claim 1, wherein the substrate is a tape.

5. A magnetic recording medium according to claim 1, wherein the substrate is a disc.

6. A magnetic recording medium according to claim 1, wherein the substrate is a drum.

7. A magnetic recording medium according to claim 1, wherein the substrate is made of polyethylene terephthalate.

8. A magnetic recording medium according to claim 1, wherein the magnetic layer comprises metallic magnetic powder.

9. A magnetic recording medium according to claim 8, wherein the metallic magnetic powder is selected from the group consisting of Fe powder, Co powder and Fe-Ni powder.

10. A magnetic recording medium according to claim 1, wherein the magnetic layer comprises a ferromagnetic thin film.

11. A magnetic recording material according to claim 10, wherein the ferromagnetic material is selected from the group consisting of Co, Ni, Fe, Co-Ni, Co-Cr, Co-P and Co-Ni-P.

* * * * *